United States Patent Office 2,994,318
Patented Aug. 1, 1961

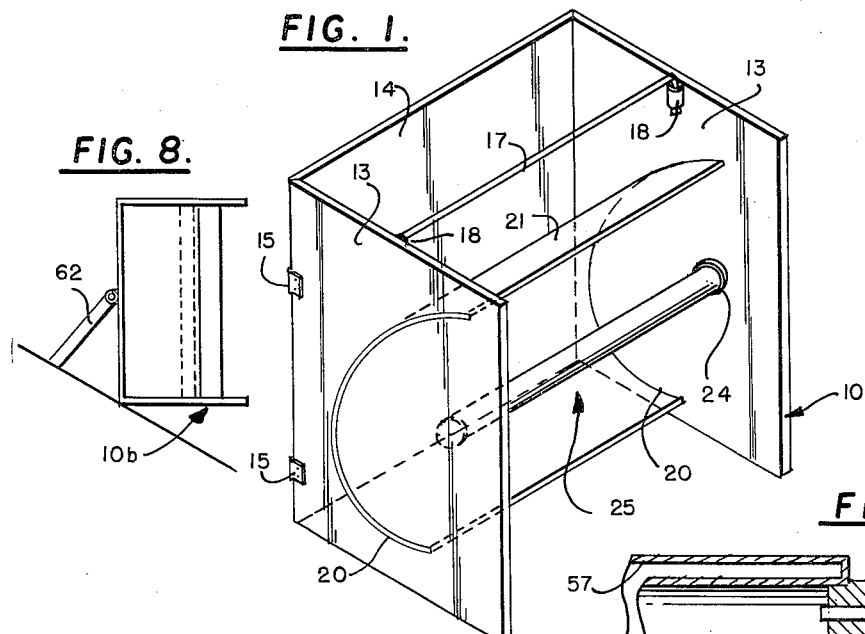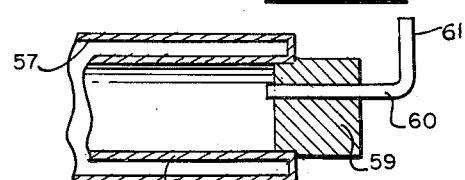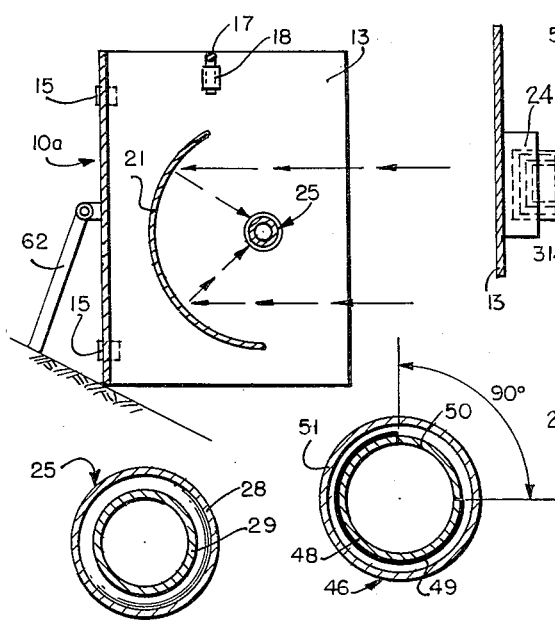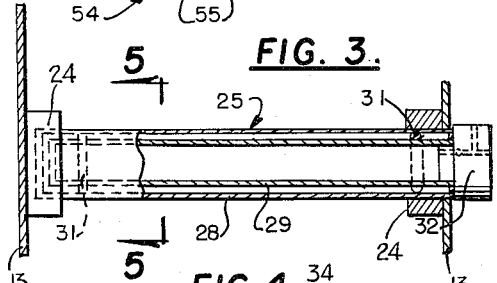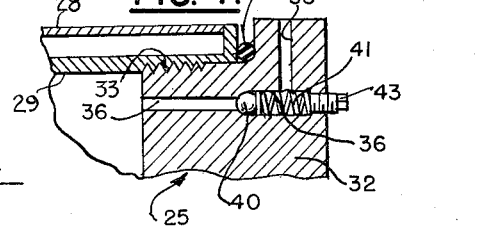

2,994,318
SOLAR PORTABLE STOVE AND PRESSURE COOKER
Willin C. Lee, Melvindale, Mich.
Filed Sept. 17, 1957, Ser. No. 684,602
5 Claims. (Cl. 126—270)

This invention relates to cooking apparatus and more particularly to a stove that utilizes solar energy.

It is an object of the present invention to provide a portable cooking stove that relies solely upon solar energy for conveniently and safely cooking food without the necessity of providing additional fuel.

Another object of the present invention is to provide a solar cook stove of the above type which may be used as a pressure cooker, a vacuum cooker, or an air insulated cooker for cooking various types of food in different ways and for different purposes.

Other objects of the invention are to provide a solar portable cooking stove bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a perspective view of a stove made in accordance with a preferred embodiment of the present invention;

FIGURE 2 is a side elevational view of the stove shown in FIGURE 1, in one position of use;

FIGURE 3 is a front elevational view of a solar pressure cooker forming a part of the apparatus shown in FIGURE 1;

FIGURE 4 is an enlarged fragmentary longitudinal cross sectional view showing certain operating parts of the pressure cooker shown in FIGURE 3;

FIGURE 5 is an enlarged transverse cross sectional view taken along line 5—5 of FIGURE 3;

FIGURE 6 is a view similar to FIGURE 5, showing a modified form of cooking unit;

FIGURE 7 is a view similar to FIGURE 4, showing a further modified form of cooking unit; and FIGURE 8 is a view similar to FIGURE 2, showing the stove used in an adjusted position.

Referring now more in detail to the drawing, a solar cooking stove 10 made in accordance with the present invention is shown to include a frame having a pair of side walls 13 pivotally connected to a back wall 14 by spaced hinges 15. This hinged connection facilitates the collapsing and erecting of the device so as to enable the stove to be readily carried from one location to another in a simple and convenient manner. A connecting bar 17 is releasably supported within sockets 18 carried by each of the side walls 13 to secure the sides in parallel spaced relationship with each other for operative use.

Each side wall 13 is provided with a parabolic slot 20 for receiving the opposite ends of a parabolic reflector 21 of a suitable construction. Each side wall 13 is also provided with a circular opening for receiving the end sockets 24 of a solar cooking unit 25. These side openings are disposed along a line that is common to the line of focus of the parabolic reflector 21 so that the cooking unit 25 is automatically disposed within this line of focus, whereby, rays from the sun are directly reflected and concentrated upon the cooking unit 25. It will be seen that slot 20 and the sockets 24 form releasable support connections between the wing elements and reflector 21 and unit 25 for permitting the apparatus to be collapsed into a compact bundle for transportation purposes.

As is more clearly shown in FIGURES 3 to 5, this cooking unit 25 is in the form of a solar pressure cooker in which a hollow circular plastic outer tube 28 slidably receives an aluminum inner tube 29 of similar configuration but of slightly smaller diameter. O-rings 31 carried by the aluminum tube 29 maintains the tube 29 in spaced concentric relationship with the interior walls of the outer tube 28. One end of the inner tube 29 is closed while the opposite end thereof is open. A plug 32 having an externally threaded portion 33 is adapted to be threadingly engaged within the open end of the inner tube 29. This plug 32 is provided with a longitudinal bore 36 and counter bore 37 which communicates with a vent 38. A gasket 34 providing an effective seal between the open end of the inner tube 29 and the plug 32, any excessive pressure built up within the tube is directed outwardly through the longitudinal bores 36, 37 and vent 38. However, in order to maintain a predetermined pressure within the inner tube 29, a ball member 40 supported within the counter bore 37 is provided with a spring 41 that maintains the ball 40 in seated engagement with the longitudinal bore 36 until the pressure within the inner tube 29 exceeds a predetermined maximum amount. A set screw 43 associated with the spring 41 provides means for adjusting the amount of pressure within the tube. The exterior surface of the inner tube 29 is preferably coated black so as to absorb the radiant energy of the sun and thus increase the heating of the contents within the tube.

Referring to FIGURE 6 of the drawing, a modified form of construction is shown in the form of an air insulating cooker 46. That includes a transparent outer tube 51 and an inner transparent tube 48 of substantially identical configuration but of smaller diameter. These tubes are supported in spaced parallel relationship with each other so as to define an air space therebetween that provides an effective insulating medium for preventing the loss of heat concentrated upon the interior of the inner tube 48. A coating 49 of heat absorbing material extends substantially three quarters of the way around the inner tube 48 to absorb the radiations, while the blank space 50 provides means for observing the contents of the inner tube and thus control the cooking thereof.

Referring now to FIGURE 7 of the drawing, a still further modified form of cooking unit 54 is shown in the form of a vacuum cooker that is constructed of a single integral member defining double side walls 55 which are spaced apart to define a closed compartment 57 therebetween in which a partial vacuum can be created. A removable end plug 59 is supported within the open end of the device so as to effectively seal the contents within the internal wall. An L-shaped tube 60 provides communication between the interior and exterior of the cooking unit so as to serve as an air or steam vent. This tube 60 can also be used to pour the contents from the interior of the cooking unit, or to pour water therefrom in a simple and efficient manner merely by rotating the tube 60 180° about its longitudinal axis so that it will discharge downwardly in the form of a pouring spout. In this connection it will be noted that during rotation of the spout, portion 61 thereof is movable from its illustrated upstanding position to a second position depending from the horizontal portion of the tube.

This stove can, of course, be used with any aforementioned cooking units, depending upon the type of cooking desired. Furthermore, the stove may be used in the horizontal position 10a shown in FIGURE 2, or in the vertical position 10b shown in FIGURE 8, depending upon the direction in which it is desired to place the cooking unit. In either event, an adjustable leg 62 provides means for supporting the stove in a horizontal position upon any surface whether inclined or not. Thus, this stove is conveniently adapted for use on all terrain and locations.

While various changes may be made in the detail construction, it shall be understood that such changes shall be within the spirit and scope of the present invention as defined by the appended claims.

What I claim as new and desire to protect by Letters Patent of the United States is:

1. Solar food cooking apparatus comprising a support means; a food storage tube carried by said support means and having at least one open end; a reflector carried by said support means for concentrating solar rays onto the tube; a removable closure normally sealing the open end of the food storage tube; and means including a vent-spout structure having a first portion rotatably carried within the closure, and a second portion positionable in upstanding and depending relation to said first portion; whereby said vent-spout structure may be rotated to position the second portion downwardly for pouring purposes.

2. Solar food cooking apparatus comprising a support structure defined by a normally upright back element and two normally upright wing elements movably mounted adjacent their rear edges on opposite lateral edges of said back element for folding movement relative thereto; a food storage tube extending between the wing elements forwardly of the back element; means forming releasable support connections between the wing elements and tube; a reflector positioned between the food storage tube and back element for concentrating solar rays onto the tube; means forming releasable support connections between the wing elements and reflector; said tube being open on at least one of its ends for insertion and removal of food.

3. Solar food cooking apparatus comprising a support structure defined by a normally upright back element and two normally upright wing elements hingedly connected at their rear edges with the lateral edges of said back element; a food storage tube extending between the wing elements forwardly of the back element; means forming releasable support connections between the wing elements and tube; a reflector positioned between the food storage tube and back element for concentrating solar rays onto the food storage tube; means forming releasable support connections between the wing elements and reflector; at least one end of said food storage tube being open for manual insertion of food thereinto; and a closure member normally closing the open end during the cooking operation.

4. Solar food cooking apparatus comprising a support structure defined by a normally upright back element and two normally upright spaced wing elements extending forwardly therefrom; hinge connections between the back element and each wing element for allowing the three elements to be folded on one another for storage purposes; a food storage tube extending between the wing elements forwardly of the back element; means forming releasable support connections between the wing elements and tube; a reflector positioned between the food storage tube and back element; means forming releasable support connections between the wing elements and reflector; and a ground-insertable leg structure pivotally connected with the support structure for cooperating therewith in supporting the apparatus at any desired inclination on a sub-surface.

5. Solar food cooking apparatus comprising a support structure defined by a normally upright back element and two normally upright wing elements hingedly connected at their rear edges with opposite lateral edges of said back element; a food storage tube having its opposite ends detachably engaged with the wing elements and supported thereby; a reflector positioned between the food storage tube and back element and having its opposite ends detachably engaged with the wing elements and supported thereby; and releasable means maintaining the wing elements in positions extending forwardly from the back element, said means including an elongated connector element extending from one wing element to the other.

References Cited in the file of this patent

UNITED STATES PATENTS

| | | |
|---|---|---|
| 593,098 | Holland | Nov. 2, 1897 |
| 1,014,972 | Nichols | Jan. 16, 1912 |
| 1,404,808 | Taylor | Jan. 31, 1922 |
| 1,814,897 | Coxe | July 14, 1931 |
| 1,946,184 | Abbott | Feb. 6, 1934 |
| 1,989,999 | Niederle | Feb. 5, 1935 |
| 2,205,378 | Abbot | June 25, 1940 |
| 2,543,115 | Lindstaedt | Feb. 27, 1951 |